J. F. BRAUN.
GANG MOWER.
APPLICATION FILED MAY 19, 1916.
1,241,086.
Patented Sept. 25, 1917.
2 SHEETS—SHEET 2.
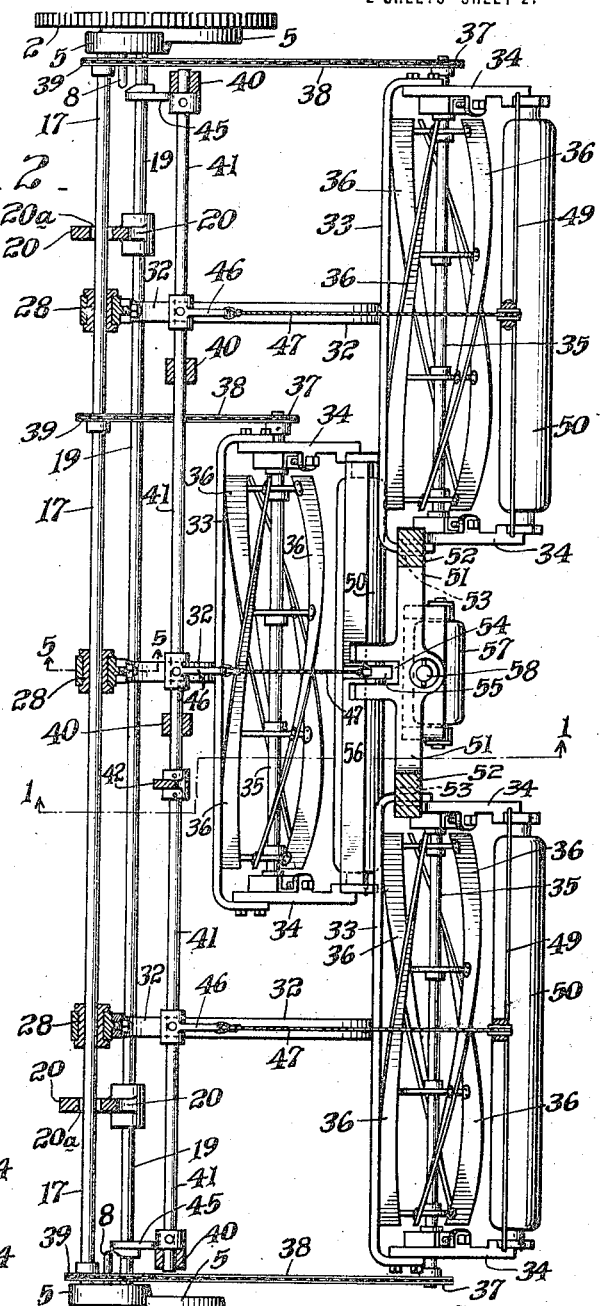
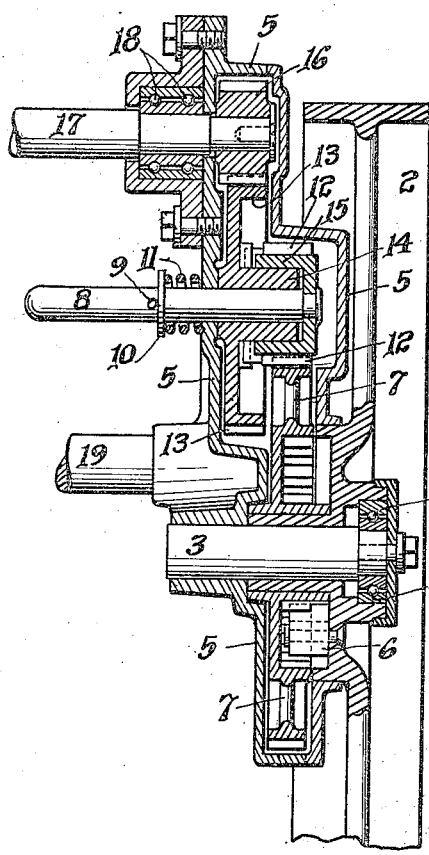
Inventor
John F. Braun
By Cornelius D. Ehret
His Attorney

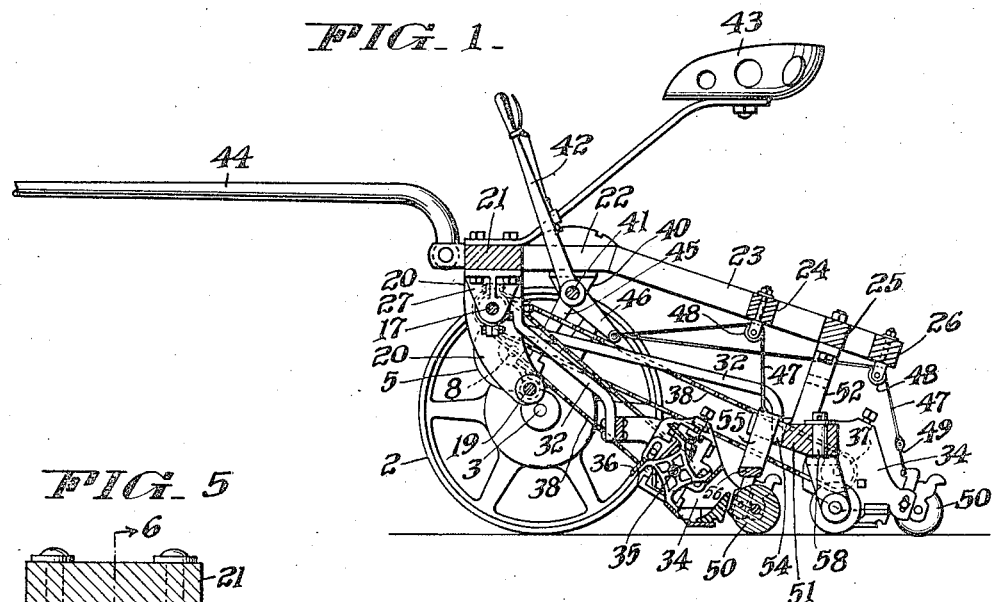
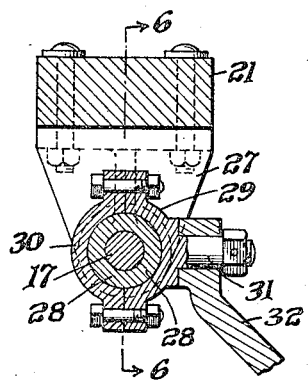
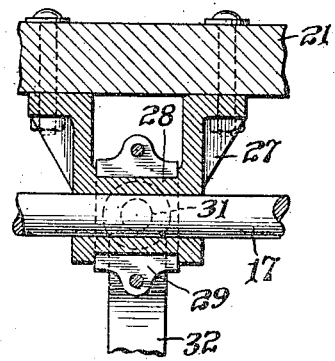
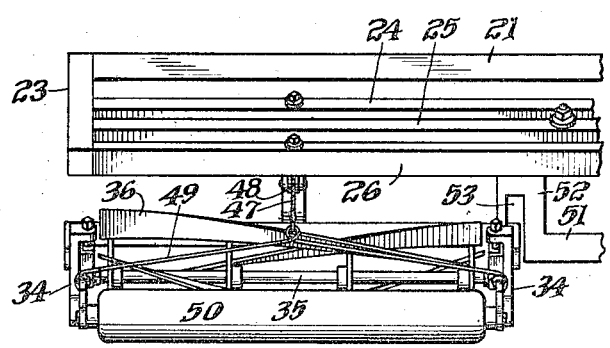

UNITED STATES PATENT OFFICE.

JOHN F. BRAUN, OF MERION STATION, PENNSYLVANIA, ASSIGNOR TO PENNSYLVANIA LAWN MOWER WORKS, OF PHILADELPHIA, PENNSYLVANIA, A CORPORATION OF PENNSYLVANIA.

GANG-MOWER.

1,241,086.  Specification of Letters Patent.  Patented Sept. 25, 1917.

Application filed May 19, 1916. Serial No. 98,516.

*To all whom it may concern:*

Be it known that I, JOHN F. BRAUN, a citizen of the United States, residing at Merion Station, county of Montgomery, and State of Pennsylvania, have invented certain new and useful Improvements in Gang-Mowers, of which the following is a specification.

It is the object of my invention to provide a gang lawn mower wherein the individual rotary cutting mechanisms are all driven in common and in unison by the same lawn engaging wheels which may serve also as the wheels of the frame or body of the apparatus; and it is a further object of my invention to provide means whereby such a gang lawn mower may readily take a curvilinear path or turn corners; with these and other objects in view it will be understood that my invention resides in a gang lawn mower of which that hereinafter described is an example.

For an illustration of my invention reference may be had to the accompanying drawings, in which:

Figure 1 is a vertical sectional view, on line 1—1 of Fig. 2, some parts in side elevation, taken through a gang mower embodying my invention.

Fig. 2 is a horizontal sectional view, with parts in plan, of apparatus illustrated in Fig. 1.

Fig. 3 is a sectional view, on enlarged scale, through a gear casing and gearing and part of a driving wheel.

Fig. 4 is a fragmentary rear elevational view of part of the apparatus illustrated in Fig. 1.

Fig. 5 is a section, on enlarged scale, taken on the line 5—5 of Fig. 2.

Fig. 6 is a section taken on line 6—6 of Fig. 5.

Referring to the drawings, 1 and 2 are wheels which engage and roll upon the lawn. Each of the wheels rotates upon a short shaft 3, Figs. 1 and 3, on the ball bearing 4, the shaft or pin 3 being held in the gear casing 5. Secured to the hub of each of the wheels is a driving pawl or dog 6 operating when the mower is moving forwardly to drive the gear wheel 7 and when moving backwardly to disengage from and fail to drive the gear wheel 7. Extending through the wall of the gear casing 5 is a short shaft or pin 8 which is movable to the right and left longitudinally, as viewed in Fig. 3. Extending through the shaft 8 outside of the gear casing is a pin 9 against which is disposed the collar 10 between which and the gear casing 5 is disposed the helical spring 11, which forces the pin 8 toward the left, Fig. 3. Within the gear casing 5 upon the pin 8 is carried the pinion 12 meshing with and driven by the gear 7. Rotatable upon the pin 8 is the gear 13 whose hub 14 is received in the hollow hub 15 of the pinion 12. With the parts in the position shown in Fig. 3 the pinion 12 is clutched to and drives the gear 13 which in turn drives the pinion 16 secured upon the long shaft 17 which has at each end a ball bearing 18 in the gear casing 5. The long tie rod 19 is fixedly secured to the gear casings 5 of both wheels. Secured upon the tie rod 19 are the upwardly extending brackets 20, through which the shaft 17 extends with clearances 20ª in the members 20, as shown in Fig. 2. At their upper ends the brackets 20 are secured to a transversely extending wooden or other member or sill 21 of a suitable body or frame. At each end of the sill 21 are secured the side sills or members 22 having the rearwardly extending portions 23. Between the members 23 and secured to them are the wooden or other members 24, 25 and 26.

Secured to the under side of the sill 21 are three brackets 27 having in their lower ends the cylindrical members 28, Figs. 2, 5 and 6, in which the shaft 17 has bearings. Clamped around each of the members 28 and having pivotal movement thereon in a vertical plane is a strap comprising the members 29 and 30, each member 29 having a substantially horizontal bearing stud 31 upon which the upper ends of the arms 32 may rock sidewise. By this construction the arms 32 may rock in a vertical plane on the shaft 17 and may rock transversely upon the studs 31 whereby the rotary cutter mechanisms hereinafter described may rise and fall and rock laterally to accommodate themselves to irregularities in the lawn surface as the mower moves forwardly.

To each arm or member 32 is secured the transversely extending bar 33 to whose backwardly turned ends are secured the members 34 in which are journaled the shafts 35 upon which are secured the cutter blades 36. Upon each shaft 35 is secured a sprocket wheel 37 driven by a sprocket chain 38 and in turn driven by a sprocket wheel 39 secured upon and rotated by the shaft 17.

Secured upon the frame are the brackets 40 in which is journaled the transversely extending long shaft 41 to which is secured the hand lever 42 which may be operated by the driver, who may occupy the seat 43 while driving a horse hitched to the shafts 44.

At each end of the shaft 41 is secured a lever arm 45 whose lower end is beveled, as shown in Fig. 2, and adapted to engage the outer rounded or beveled ends of the pins 8.

And secured upon the shaft 41 are the lever arms 46 to whose outer ends are secured the cords or chains 47 passing over pulleys 48 carried on the members 24 and 26, the other ends of the cords 47 being connected to bails 49 connected to the cutter mechanisms. Each cutter mechanism is provided with a roller 50 journaled in the members 34 and engaging the lawn surface.

To facilitate turning corners or taking curvilinear paths there may be provided structure for interconnecting the individual rotary cutter mechanisms. Said structure may comprise the horizontally extending member 51 having lateral upwardly extending parts 52 secured to the transverse member 25 of the frame. At its ends the member 51 has the slots 53, Figs. 2 and 4, loosely embracing the backwardly turned ends of the members 33 of the two outside rotary cutter mechanisms and having at its center the slot 54, Figs. 1 and 2, loosely embracing a projection 55 on the cross bar 56 of the middle rotary cutting mechanism. The idler roller 57, rolling in contact with the lawn surface, is swingable about a vertical pivot 58 in the member 51.

The operation is as follows:

As the gang mower is moved over the lawn surface the wheels 1 and 2 are rotated and through the gearing described in connection with Fig. 3 rotate the shaft 17 at high speed, and this shaft through the sprocket wheels and chains drive the rotary cutter blades 36 of the various rotary cutter mechanisms, all these mechanisms being driven in unison or in common from the same pair of wheels 1 and 2.

As the gang mower takes a curvilinear path or turns corners, the individual cutter mechanisms will continue to rotate all at the same speed and at a speed corresponding with that wheel, 1 or 2, which is most rapidly rotating. And in so turning a corner or taking a curvilinear path the member 51 with its loose connections to the several individual rotary cutter mechanisms so interconnects them that they more readily take a curvilinear path in that substantial lateral deflection of the bars or members 32 is prevented.

It will be noted that these arms 32 are pivoted upon the shaft 17 from which the cutter blades are driven, with the result that as the individual cutter mechanisms rise and fall over variations of the lawn surface the sprocket chains 38 always maintain the same tension or tautness, and there is no binding effect due to such rising and falling of the cutter mechanisms. And while each cutter mechanism is thus allowed to rise and fall individually by member 32 rocking on bearing 28, it may tilt laterally by the rocking movement of the member 32 upon the stud 31, and in this way accommodate itself to all variations of the lawn surface within its own path.

When it is desired to lift the cutter mechanisms from operative relation with the lawn the driver moves the lever 42, Fig. 1, in a clockwise direction and so rotates the shaft 41 in like direction and moves the cranks or arms 46 in like direction and thereby draws up on the ropes or chains 47 and lifts the individual cutter mechanisms which in rising swing upon their respective bearings 28 on the shaft 17. And in so actuating the lifting lever 42 each lever 45 engages with its lower beveled end with the rounded or beveled end of the pin 8 which is then shifted toward the right, Fig. 3, to unclutch the pinion 12 from the gear 13, thus preventing the gearing from further rotating the shaft 17 and consequently from further rotating the cutter blades 36 which so come to rest. In consequence the gang mower may continue in a forward direction without rotating the cutter blades, while upon backward movement of the gang mower when in operative relation with respect to the lawn surface the pawl or dog 6 fails to drive the gear 7 and in consequence the shaft 17 is not rotated.

What I claim is:

1. In a gang mower, a ground engaging wheel, a plurality of individual rotary cutter mechanisms disposed in different rows, a shaft common to said cutter mechanisms driven by said wheel, driving connections between said shaft and each of said cutter mechanisms, a frame, a connection from each of said cutter mechanisms to said frame for moving the cutter mechanisms over the ground, and means allowing pivotal movement of said connection about said shaft.

2. In a gang mower, a ground engaging wheel, a plurality of individual rotary cutter mechanisms disposed in different rows, a shaft common to said cutter mechanisms driven by said wheel, driving connections between said shaft and each of said cutter mechanisms, a frame, a connection from each of said cutter mechanisms to said frame, means allowing pivotal movement of said connection about said shaft, and means allowing pivotal movement of said connection whereby the attached cutter mechanism may rock laterally.

3. The combination with ground engaging wheels, of a frame carried thereby, a plurality of cutter mechanisms disposed in different ranks, a shaft extending transversely of said frame and driven from at least one of said ground engaging wheels, a connection from each cutter mechanism to said frame at a point substantially co-incident with said shaft, and driving connections from said shaft to said cutter mechanisms.

4. The combination with ground engaging wheels, of a frame carried thereby, a plurality of cutter mechanisms disposed in different ranks, a shaft extending transversely of said frame and driven from at least one of said ground engaging wheels, a connection from each cutter mechanism to said frame at a point substantially co-incident with said shaft, driving connections from said shaft to said cutter mechanisms, and means attached to said frame and having lost motion connections with said cutter mechanisms.

5. A gang mower comprising a plurality of ground engaging wheels, a rotary shaft, gearing driven by each of said wheels and driving said shaft, a plurality of individual rotary cutter mechanisms driven in common from said shaft, and means for simultaneously lifting said cutter mechanisms and disconnecting said gearing from said shaft.

6. A gang mower comprising a plurality of ground engaging wheels, a rotary shaft, gearing driven by each of said wheels and driving said shaft, a plurality of individual rotary cutter mechanisms driven in common from said shaft, and means for interconnecting said cutter mechanisms for intersupporting said cutter mechanisms when taking a curvilinear path.

7. A gang mower comprising a plurality of ground engaging wheels, a rotary shaft, gearing driven by each of said wheels and driving said shaft, a plurality of individual rotary cutter mechanisms driven in common from said shaft, each of said cutter mechanisms having a support and means for interconnecting said supports when said cutter mechanisms take a curvilinear path.

8. A gang mower comprising a plurality of ground engaging wheels, a rotary shaft, gearing driven by each of said wheels and driving said shaft, a plurality of individual rotary cutter mechanisms driven in common from said shaft, each of said cutter mechanisms having a support, means for interconnecting said supports when said cutter mechanisms take a curvilinear path, and a ground engaging roller on said means.

9. A gang mower comprising a plurality of ground engaging wheels, a rotary shaft, gearing driven by each of said wheels and driving said shaft, a plurality of individual rotary cutter mechanisms driven in common from said shaft, each of said cutter mechanisms having a support, means for interconnecting said supports when said cutter mechanisms take a curvilinear path, and a ground engaging roller having pivotal movement about a vertical axis on said means.

10. A gang mower comprising a plurality of ground engaging wheels, a rotary shaft, gearing driven by each of said wheels and driving said shaft, casings for said gearing, a tie rod connecting said gear casings, as idler ground engaging roller, a frame supported on said tie rod and on said roller, said frame when moved transmitting the movement through said tie rod to said wheels, a plurality of individual cutter mechanisms driven in common from said rotary shaft, and means carried by said roller preventing lateral movement of said cutter mechanisms.

11. A gang mower comprising a plurality of ground engaging wheels, a rotary shaft, gearing driven by each of said wheels and driving said shaft, casings for said gearing, a tie rod connecting said gear casings, a frame supported on said tie rod, said frame when moved transmitting the movement through said tie rod to said wheels, a plurality of individual cutter mechanisms driven in common from said rotary shaft, a second shaft extending parallel to said rotary shaft, a lever for actuating said second shaft, and means actuated by said second shaft for disconnecting said first named shaft from said gearing.

12. A gang mower comprising a plurality of ground engaging wheels, a rotary shaft, gearing driven by each of said wheels and driving said shaft, casings for said gearing, a tie rod connecting said gear casings, a frame supported on said tie rod, said frame when moved transmitting the movement through said tie rod to said wheels, a plurailty of individual cutter mechanisms driven in common from said rotary shaft, a second shaft extending parallel to said rotary shaft, a lever for actuating said second shaft, and means actuated by said second shaft for disconnecting said first named shaft from said gearing and for lifting said cutter mechanisms.

13. The combination in a mowing machine of supporting wheels; a frame mounted thereon; a plurality of independently operated mowers having their cutting elements driven from at least one of said wheels and each including a grass roller supporting a portion of its weight; with means for supporting the remainder of the weight of each mower from the frame, and means carried by said frame and having lost motion connections with said mowers for limiting their lateral deflection.

14. The combination in a mowing machine of supporting wheels; a frame carried thereby; a driver's seat on said frame; a plurality of mowers each supported partly by its own grass roller and partly by said frame; with means for driving the cutting mechanism of the mowers from at least one of said supporting wheels, and means co-acting with said mowers adjacent their grass rollers for preventing lateral deflection of said mowers.

15. In a gang mower, the combination with a ground engaging wheel, a frame, a plurality of cutter mechanisms, a connection from each cutter mechanism to said frame for moving said cutter mechanism over the ground, a transversely extending shaft driven by said wheel, and a sprocket chain for each cutter mechanism driving the same and driven by said shaft.

16. In a gang mower, the combination with a ground engaging wheel, a frame, a plurality of cutter mechanisms, a shaft driven by said wheel, an independent driving connection between each cutter mechanism and said shaft, a pivot for each cutter mechanism carried by said frame, and a member having movement on said pivot and connected to said cutter mechanism.

17. In a gang mower, the combination with ground engaging wheels, of a frame carried thereby, a plurality of individual mower units each comprising a ground engaging roller and a cutter mechanism, means driven from at least one of said wheels for driving said cutter mechanisms of said units, and means connecting said mower units to said frame for moving said mower units over the ground independently of said driving means.

In testimony whereof I have hereunto affixed my signature this 18th day of May, 1916.

JOHN F. BRAUN.

Copies of this patent may be obtained for five cents each, by addressing the "Commissioner of Patents, Washington, D. C."

It is hereby certified that in Letters Patent No. 1,241,086, granted September 25, 1917, upon the application of John F. Braun, of Merion Station, Pennsylvania, for an improvement in "Gang-Mowers," errors appear in the printed specification requiring correction as follows: Page 3, line 58, claim 7, after the word "support" insert a comma; same page, line 87, claim 10, for the word "as" read *an;* and lines 119–120, claim 12, for the word "plurailty" read *plurality;* and that the said Letters Patent should be read with these corrections therein that the same may conform to the record of the case in the Patent Office.

Signed and sealed this 20th day of November, A. D., 1917.

[SEAL.]

R. F. WHITEHEAD,
*Acting Commissioner of Patents.*

Cl. 56—19.